(12) United States Patent
Wittkopp et al.

(10) Patent No.: US 8,419,585 B2
(45) Date of Patent: Apr. 16, 2013

(54) MULTI-SPEED TRANSMISSION HAVING STACKED PLANETARY GEAR SETS

(75) Inventors: Scott H. Wittkopp, Ypsilanti, MI (US); Andrew W. Phillips, Rochester, MI (US); Edward W. Mellet, Rochester Hills, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 177 days.

(21) Appl. No.: 12/984,995

(22) Filed: Jan. 5, 2011

(65) Prior Publication Data
US 2012/0172170 A1 Jul. 5, 2012

(51) Int. Cl.
*F16H 3/44* (2006.01)
(52) U.S. Cl.
USPC ........................................................ 475/269
(58) Field of Classification Search .................. 475/269, 475/284, 903, 330
See application file for complete search history.

(56) References Cited

U.S. PATENT DOCUMENTS

| | | |
|---|---|---|
| 4,224,838 A | 9/1980 | Roushdy et al. |
| 4,229,996 A | 10/1980 | Hildebrand |
| 5,285,111 A | 2/1994 | Sherman |
| 5,429,557 A | 7/1995 | Beim |
| 5,503,605 A | 4/1996 | Beim |
| 5,558,173 A | 9/1996 | Sherman |
| 5,919,111 A | 7/1999 | Park |
| 5,993,347 A | 11/1999 | Park |
| 7,699,736 B2 | 4/2010 | Diosi et al. |
| 7,803,082 B2 | 9/2010 | Diosi et al. |
| 7,824,302 B2 | 11/2010 | Diosi et al. |
| 8,007,393 B2 * | 8/2011 | Wittkopp et al. ............ 475/275 |
| 2006/0180366 A1 | 8/2006 | Brill et al. |
| 2008/0153653 A1 | 6/2008 | Diosi et al. |
| 2008/0269004 A1 | 10/2008 | Diosi et al. |
| 2008/0293535 A1 * | 11/2008 | Phillips et al. .............. 475/275 |
| 2009/0118065 A1 * | 5/2009 | Phillips et al. .............. 475/284 |
| 2009/0305837 A1 | 12/2009 | Hiraiwa |
| 2010/0019601 A1 | 1/2010 | Saban et al. |
| 2010/0041507 A1 | 2/2010 | Gumpoltsberger et al. |
| 2010/0041508 A1 | 2/2010 | Gumpoltsberger et al. |
| 2010/0041509 A1 | 2/2010 | Gumpoltsberger et al. |
| 2010/0044141 A1 | 2/2010 | Kimes et al. |
| 2010/0139559 A1 | 6/2010 | Scott, Sr. et al. |
| 2010/0311537 A1 | 12/2010 | Ziemer |
| 2011/0009228 A1 | 1/2011 | Bauknecht et al. |
| 2011/0009229 A1 | 1/2011 | Bauknecht et al. |

FOREIGN PATENT DOCUMENTS

| | | |
|---|---|---|
| DE | 102008000428 | 9/2009 |
| DE | 102008041201 | 2/2010 |
| DE | 102009027775 | 1/2011 |
| EP | 0849498 | 6/1998 |
| WO | WO2010139553 | 12/2010 |
| WO | WO2010139559 | 12/2010 |

* cited by examiner

*Primary Examiner* — David D Le
*Assistant Examiner* — David J Hlavka

(57) ABSTRACT

A transmission is has an input member, an output member, a stacked planetary gear set arrangement, a planetary gear set, a plurality of coupling members and a plurality of torque transmitting devices. The stacked planetary gear set arrangement has a first, second, third, fourth and fifth member and the planetary gear set has a first, second and third member. The torque transmitting devices include clutches and brakes.

15 Claims, 2 Drawing Sheets

| GEAR STATE | GEAR RATIO | RATIO STEP | TORQUE TRANSMITTING ELEMENTS ||||||
|---|---|---|---|---|---|---|---|---|
| | | | 36 | 34 | 28 | 26 | 32 | 30 |
| REV | -5.525 | | X | X | X | | | |
| N | | -1.03 | O | | | | | |
| 1ST | 5.375 | | X | | | X | X | |
| 2ND | 3.250 | 1.65 | X | X | | | X | |
| 3RD | 1.994 | 1.63 | | X | | X | X | |
| 4TH | 1.625 | 1.23 | | X | X | | X | |
| 5TH | 1.238 | 1.31 | | X | | | X | X |
| 6TH | 1.000 | 1.24 | | | X | | X | X |
| 7TH | 0.898 | 1.11 | | X | X | | | X |
| 8TH | 0.773 | 1.16 | | X | | X | | X |

X = ON - ENGAGED CARRYING TORQUE
O = ON - ENGAGED NOT CARRYING TORQUE

FIG. 3

MULTI-SPEED TRANSMISSION HAVING STACKED PLANETARY GEAR SETS

FIELD

The invention relates generally to a multiple speed transmission having a plurality of planetary gear sets and a plurality of torque transmitting devices and more particularly to a transmission having eight or more speeds, three planetary gear sets of which two are stacked radially and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets of which two are stacked to form a stacked planetary gear set arrangement, a plurality of coupling members and a plurality of torque transmitting devices. The torque transmitting devices are for example clutches and brakes.

In an aspect of the present invention, a planetary gear set is provided having a sun gear, a carrier member for rotatably supporting a plurality of pinion gears and a ring gear member. The stacked planetary gear set arrangement has a sun gear, a first carrier member for rotatably supporting a first plurality of pinion gears, a second carrier member for rotatably supporting a second and a third plurality of pinion gears, a ring gear and a common member.

In another embodiment of the present invention, an interconnecting member continuously interconnects the first carrier member of the stacked planetary gear set arrangement with the second carrier member of the stacked planetary gear set arrangement.

In still another embodiment of the present invention, a first torque transmitting mechanism is provided that is selectively engageable to interconnect the sun gear of the stacked planetary gear set arrangement with the sun gear of the planetary gear set.

In still another embodiment of the present invention, a second torque transmitting mechanism is provided that is selectively engageable to interconnect the sun gear of the stacked planetary gear set arrangement with the carrier member of the planetary gear set.

In still another embodiment of the present invention, a third torque transmitting mechanism is provided that is selectively engageable to interconnect the first and the second carrier members of the stacked planetary gear set arrangement with the ring gear of the planetary gear set and the input member.

In still another embodiment of the present invention, a fourth torque transmitting mechanism is provided that is selectively engageable to interconnect the common member of the stacked planetary gear set arrangement with the carrier member of the planetary gear set.

In another embodiment of the present invention, a fifth torque transmitting mechanism is provided that is selectively engageable to interconnect the sun gear of the planetary gear set with the stationary member.

In another embodiment of the present invention, a sixth torque transmitting mechanism is provided that is selectively engageable to interconnect the first and the second carrier members of the stacked planetary gear set arrangement with the stationary member.

In still another embodiment of the present invention, the torque transmitting mechanisms are selectively engageable in combinations of at least three to establish at least eight forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

Figure 1:
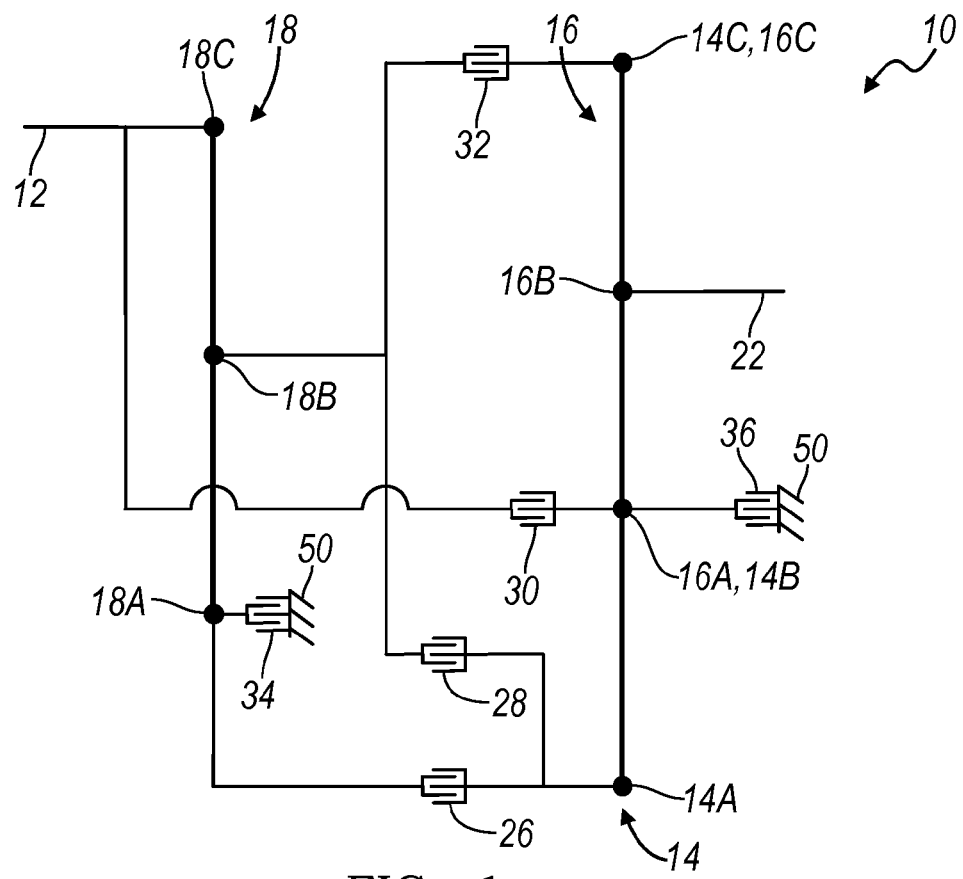
FIG. 1 is a lever diagram of an embodiment of an eight speed transmission according to the present invention.

Referring now to FIG. 1, an embodiment of an eight or more speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and an output shaft or member 22. In the lever diagram of FIG. 1, the first planetary gear set 14 and the second planetary gear set 16 have been combined and are represented by a single four node lever having: a first node 14A, a second node 16A, 14B, a third node 16B and a fourth node 14C, 16C. The lever of the third planetary gear set 18 has three nodes: a first node 18A, a second node 18B and a third node 18C.

The input member 12 is continuously coupled to the third node 18C of the third planetary gear set 18. The output member 22 is continuously coupled to the second node 16B of the second planetary gear set 16.

A first clutch 26 selectively connects the first node 14A of the first planetary gear set 14 with the first node 18A of the third planetary gear set 18. A second clutch 28 selectively connects the first node 14A of the first planetary gear set 14 with the second node 18B of the third planetary gear set 18. A third clutch 30 selectively connects the input member or shaft 12 and the third node 18C of the third planetary gear set 18 with second node 16A, 14B. A fourth clutch 32 selectively connects the fourth node 14C, 16A with the second node 18B of the third planetary gear set 18. A first brake 34 selectively connects the first node 18A of the third planetary gear set 18 with a stationary member or transmission housing 50. A second brake 36 selectively connects the second node 16A, 14B with the stationary member or transmission housing 50.

Figure 2:
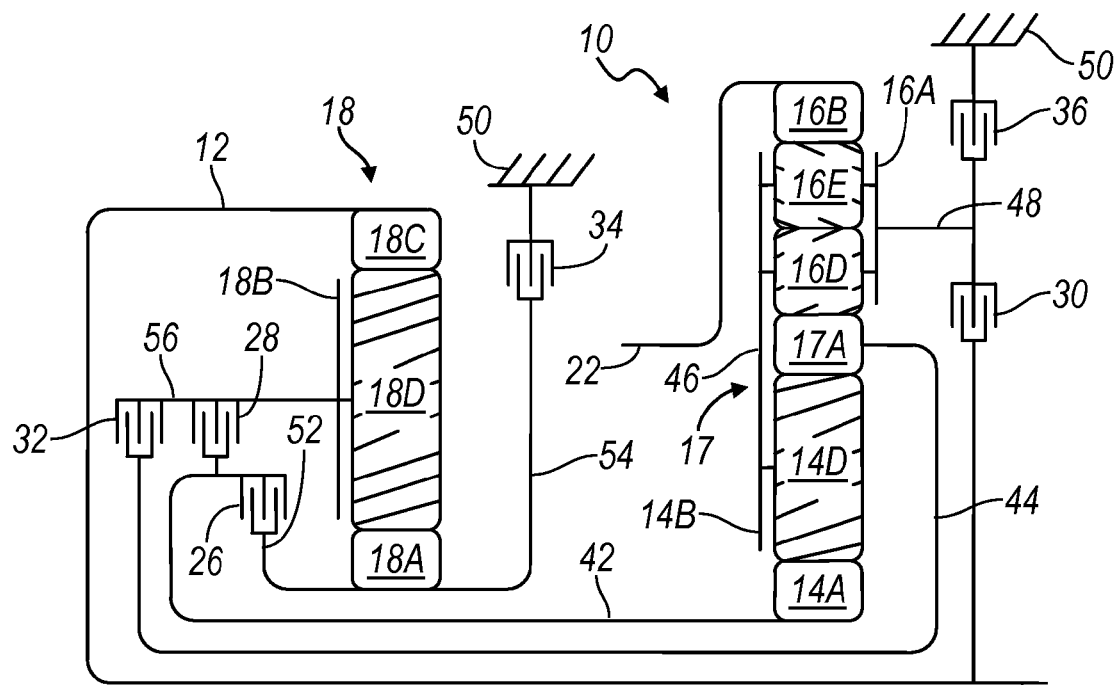
FIG. 2 is a diagrammatic illustration of an embodiment of an eight speed transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

Planetary gear sets 14 and 16 are radially stacked or spatially disposed to form a stacked planetary gear set arrangement 17. Stacked planetary gear set arrangement 17 includes a common member 17A that corresponds with the fourth node 14C, 16C of the lever diagram shown in FIG. 1. Common member 17A functions as the ring gear member of planetary gear set 14 and simultaneously as the sun gear member of planetary gear set 16. Planetary gear set 14 further includes a sun gear member 14A and a planet gear carrier member 14B that rotatably supports a set of planet gears 14D (only one of which is shown). The sun gear member 14A is connected for common rotation with a first shaft or interconnecting member 42. The ring gear member or common member 17A is connected for common rotation with a second shaft or interconnecting member 44. The planet carrier member 14B is connected for common rotation with a third shaft or interconnecting member 46. The planet gears 14D are each configured to intermesh with both sun gear member 14A and ring gear or common member 17A.

In planetary gear set 16, common member 17A functions as the sun gear member of planetary gear sets 16. Planetary gear set 16 further includes a ring gear member 16B and a planet gear carrier member 16A that rotatably supports a first set of planet gears 16D (only one of which is shown) and a second set of planet gears 16E (only one of which is shown). As stated above with respect to planetary gear set 14, common member 17A is connected for common rotation with the second shaft or interconnecting member 44. The ring gear member 16B is connected for common rotation with the output shaft or member 22. The planet carrier member 16A is connected for common rotation with the third shaft or interconnecting member 46 and with a fourth shaft or interconnecting member 48. The first set of planet gears 16D are each configured to intermesh with both sun gear member or common member 17A and the second set of planet gears 16E. The second set of planet gears 16E are each configured to intermesh with both the ring gear member 16B and the first set of planet gears 16D. Of course, the present invention contemplates that the carrier members 14B and 16A of planetary gear sets 14 and 16 may be combined to form a single carrier member.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with a fifth shaft or interconnecting member 52 and with a sixth shaft or interconnecting member 54. The ring gear member 18C is connected for common rotation with the input member or shaft 12. The planet carrier member 18B is connected for common rotation with a seventh shaft or interconnecting member 56. The planet gears 18D are each configured to intermesh with both the sun gear member 18A and the ring gear member 18C.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28, 30, 32 and brakes 34, 36 allow for selective interconnection of the shafts or interconnecting members, members of the planetary gear sets and the housing. For example, the first clutch 26 is selectively engageable to connect the first shaft or interconnecting member 42 with the fifth shaft or interconnecting member 52. The second clutch 28 is selectively engageable to connect the first shaft or interconnecting member 42 with the seventh shaft or interconnecting member 56. The third clutch 30 is selectively engageable to connect the fourth shaft or interconnecting member 48 with the input shaft or member 12. The fourth clutch 32 is selectively engageable to connect the second shaft or interconnecting member 44 with the seventh shaft or interconnecting member 56. The first brake 34 is selectively engageable to connect the sixth shaft or interconnecting member 54 with the stationary element or the transmission housing 50 in order to restrict the member 54 from rotating relative to the transmission housing 50. The second brake 36 is selectively engageable to connect the fourth shaft or interconnecting member 48 with the stationary element or the transmission housing 50 in order to restrict the member 48 from rotating relative to the transmission housing 50.

Referring now to FIG. 2 and FIG. 3, the operation of the embodiment of the eight speed transmission 10 will be described. It will be appreciated that transmission 10 is capable of transmitting torque from the input shaft or member 12 to the output shaft or member 22 in at least eight forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, fourth clutch 32, first brake 34 and second brake 36), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

For example, to establish a reverse gear, second clutch 28 and first and second brakes 34, 36 are engaged or activated. The second clutch 28 connects the first shaft or interconnecting member 42 with the seventh shaft or interconnecting member 56. The first brake 34 connects the sixth shaft or interconnecting member 54 with the stationary element or the transmission housing 50 in order to restrict the member 54 from rotating relative to the transmission housing 50. The second brake 36 connects the fourth shaft or interconnecting member 48 with the stationary element or the transmission housing 50 in order to restrict the member 48 from rotating relative to the transmission housing 50. Likewise, the eight forward ratios are achieved through different combinations of clutch and brake engagement, as shown in FIG. 3.

It will be appreciated that the foregoing explanation of operation and gear states of the eight speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the essence of the invention are intended to be within the scope of the invention. Such variations are not to be regarded as a departure from the spirit and scope of the invention.

The invention claimed is:

1. A transmission comprising:
   an input member;
   an output member;
   a planetary gear set having a first, a second and a third member;
   a stacked planetary gear set arrangement having a sun gear, a common member, a first carrier member, a ring gear and a second carrier member, wherein the common member has an annular shape with a first plurality of gear teeth on an inner periphery of the common member and a second plurality of gear teeth on an outer periphery of the common member;
   an interconnecting member continuously interconnecting the first carrier member of the stacked planetary gear set arrangement with the second carrier member of the stacked planetary gear set arrangement; and
   at least six torque transmitting mechanisms each selectively engageable to interconnect at least one of the sun gear, common member, first carrier member and ring gear of the stacked planetary gear set arrangement and at least one of the first, second and third members of the planetary gear set with another of sun gear, common member, first carrier member and ring gear of the stacked planetary gear set arrangement, another of the first, second and third members of the planetary gear set and a stationary member, and
   wherein the at least six torque transmitting mechanisms are selectively engageable in combinations of at least three to establish at least eight forward speed ratios and at least one reverse speed ratio between the input member and the output member.

2. The transmission of claim 1 wherein a first of the at least six torque transmitting mechanisms is selectively engageable to interconnect the sun gear of the stacked planetary gear set arrangement with the first member of the planetary gear set.

3. The transmission of claim 2 wherein a second of the at least six torque transmitting mechanisms is selectively engageable to interconnect the sun gear of the stacked planetary gear set arrangement with the second member of the planetary gear set.

4. The transmission of claim 3 wherein a third of the at least six torque transmitting mechanisms is selectively engageable to interconnect the first carrier member and the second carrier member of the stacked planetary gear set arrangement with the third member of the planetary gear set and the input member.

5. The transmission of claim 4 wherein a fourth of the at least six torque transmitting mechanisms is selectively engageable to interconnect the common member of the stacked planetary gear set arrangement with the second member of the planetary gear set.

6. The transmission of claim 5 wherein a fifth of the at least six torque transmitting mechanisms is selectively engageable to interconnect the first member of the planetary gear set with the stationary member.

7. The transmission of claim 6 wherein a sixth of the at least six torque transmitting mechanisms is selectively engageable to interconnect the first carrier member and the second carrier member of the stacked planetary gear set arrangement with the stationary member.

8. The transmission of claim 1 wherein two of the at least six torque transmitting mechanisms are brakes and four of the at least four torque transmitting mechanisms are clutches.

9. The transmission of claim 1 wherein the first member of the planetary gear set is a sun gear the second member of the planetary gear set is a carrier member and the third member of the planetary gear set is a ring gear.

10. The transmission of claim 9 wherein the common member of the stacked planetary gear set arrangement meshes with a first plurality of pinion gears rotatably supported by the first carrier member of the stacked planetary gear set arrangement and with a second and a third plurality of pinion gears rotatably supported by the second carrier member of the stacked planetary gear set arrangement.

11. A transmission comprising:
    an input member;
    an output member;
    a planetary gear set having a first, a second and a third member;
    a stacked planetary gear set arrangement having a sun gear, a common member, a first carrier member, a ring gear and a second carrier member, wherein the common member has an annular shape with a first plurality of gear teeth on an inner periphery of the common member and a second plurality of gear teeth on an outer periphery of the common member;
    an interconnecting member continuously interconnecting the first carrier member of the stacked planetary gear set arrangement with the second carrier member of the stacked planetary gear set arrangement;

a first torque transmitting mechanism selectively engageable to interconnect the sun gear of the stacked planetary gear set arrangement with the first member of the planetary gear set;

a second torque transmitting mechanism selectively engageable to interconnect the sun gear of the stacked planetary gear set arrangement with the second member of the planetary gear set;

a third torque transmitting mechanism selectively engageable to interconnect the third first carrier member and the fifth second carrier member of the stacked planetary gear set arrangement with the third member of the planetary gear set and the input member;

a fourth torque transmitting mechanism selectively engageable to interconnect the common member of the stacked planetary gear set arrangement with the second member of the planetary gear set;

a fifth torque transmitting mechanism selectively engageable to interconnect the first member of the planetary gear set with the stationary member;

a sixth torque transmitting mechanism selectively engageable to interconnect the first carrier member and the second carrier member of the stacked planetary gear set arrangement with the stationary member, and wherein the torque transmitting mechanisms are selectively engageable in combinations of at least three to establish at least eight forward speed ratios and at least one reverse speed ratio between the input member and the output member.

12. The transmission of claim 11 wherein the first member of the planetary gear set is a sun gear the second member of the planetary gear set is a carrier member and the third member of the planetary gear set is a ring gear.

13. The transmission of claim 12 wherein the common member of the stacked planetary gear set arrangement meshes with a first plurality of pinion gears rotatably supported by the first carrier member of the stacked planetary gear set arrangement and with a second and a third plurality of pinion gears rotatably supported by the second carrier member of the stacked planetary gear set arrangement.

14. A transmission comprising:

an input shaft;

an output shaft;

a planetary gear set having a sun gear, a carrier member for rotatably supporting a plurality of pinion gears and a ring gear member;

a stacked planetary gear set arrangement having a sun gear, a first carrier member for rotatably supporting a first plurality of pinion gears, a second carrier member for rotatably supporting a second and a third plurality of pinion gears, a ring gear and a common member, wherein the common member has an annular shape with a first plurality of gear teeth on an inner periphery of the common member and a second plurality of gear teeth on an outer periphery of the common member;

an interconnecting member continuously interconnecting the first carrier member of the stacked planetary gear set arrangement with the second carrier member of the stacked planetary gear set arrangement;

a first torque transmitting mechanism selectively engageable to interconnect the sun gear of the stacked planetary gear set arrangement with the sun gear of the planetary gear set;

a second torque transmitting mechanism selectively engageable to interconnect the sun gear of the stacked planetary gear set arrangement with the carrier member of the planetary gear set;

a third torque transmitting mechanism selectively engageable to interconnect the first and the second carrier members of the stacked planetary gear set arrangement with the ring gear of the planetary gear set and the input member;

a fourth torque transmitting mechanism selectively engageable to interconnect the common member of the stacked planetary gear set arrangement with the carrier member of the planetary gear set;

a fifth torque transmitting mechanism selectively engageable to interconnect the sun gear of the planetary gear set with the stationary member; and a sixth torque transmitting mechanism selectively engageable to interconnect the first and the second carrier members of the stacked planetary gear set arrangement with the stationary member, and wherein the torque transmitting mechanisms are selectively engageable in combinations of at least three to establish at least eight forward speed ratios and at least one reverse speed ratio between the input member and the output member.

15. The transmission of claim 14 wherein the common member of the stacked planetary gear set arrangement meshes with the first plurality of pinion gears rotatably supported by the first carrier member of the stacked planetary gear set arrangement and with the second and the third plurality of pinion gears rotatably supported by the second carrier member of the stacked planetary gear set arrangement.

* * * * *